US010787081B2

(12) United States Patent
Laaksonen et al.

(10) Patent No.: US 10,787,081 B2
(45) Date of Patent: Sep. 29, 2020

(54) WORKING MACHINE

(71) Applicant: Danfoss Mobile Electrification Oy, Lappeenranta (FI)

(72) Inventors: Jonna Laaksonen, Lappeenranta (FI); Tero Järveläinen, Lappeenranta (FI)

(73) Assignee: DANFOSS MOBILE ELECTRIFICATION OY, Lappenranta (FI)

( * ) Notice: Subject to any disclaimer, the term of this patent is extended or adjusted under 35 U.S.C. 154(b) by 65 days.

(21) Appl. No.: 16/174,492

(22) Filed: Oct. 30, 2018

(65) Prior Publication Data

US 2019/0143819 A1 May 16, 2019

(30) Foreign Application Priority Data

Nov. 15, 2017 (EP) .................................... 17201772

(51) Int. Cl.

| | |
|---|---|
| ***B60L 9/00*** | (2019.01) |
| ***H02J 3/38*** | (2006.01) |
| ***B60L 53/12*** | (2019.01) |
| ***B60L 50/53*** | (2019.01) |
| ***B60L 50/15*** | (2019.01) |

(52) U.S. Cl.

CPC ................. *B60L 9/00* (2013.01); *B60L 50/15* (2019.02); *B60L 50/53* (2019.02); *B60L 53/12* (2019.02); *H02J 3/38* (2013.01); *B60L 2200/40* (2013.01)

(58) Field of Classification Search

CPC ........ B60L 9/00; B60L 2200/40; B60L 50/15; B60L 53/12; B60L 50/53; H02J 3/38

See application file for complete search history.

(56) References Cited

U.S. PATENT DOCUMENTS

| | | | | |
|---|---|---|---|---|
| 2013/0048382 A1 | 2/2013 | Rudinec | | |
| 2015/0210231 A1* | 7/2015 | Naumanen | ............. B60R 16/03 | 307/9.1 |

FOREIGN PATENT DOCUMENTS

| | | |
|---|---|---|
| EP | 2738035 A1 | 6/2014 |
| EP | 3037297 A1 | 6/2016 |

OTHER PUBLICATIONS

Extended European Search Report for Serial No. 17201772.5 dated May 11, 2018.

* cited by examiner

*Primary Examiner* — Jared Fureman
*Assistant Examiner* — Duc M Pham
(74) *Attorney, Agent, or Firm* — McCormick, Paulding & Huber PLLC

(57) ABSTRACT

A working machine comprises a direct voltage source (301), a first power converter (302) for transferring energy from the direct voltage source to electric machines (303*a*, 303*b*) driving actuators of the working machine, an electric connector system (304) for electrically connecting to an external power grid, a second power converter (305) for transferring energy from the external power grid to the direct voltage source, and alternating current electric machines (306*a*, 306*b*) driving auxiliary devices of the working machine. The electric connector system is suitable for connecting the alternating current electric machines to receive alternating voltage of the external power grid, and the second power converter is suitable for transferring energy from the direct voltage source to the alternating current electric machines. Thus, the electric machines driving the auxiliary devices can be energized directly by the external power grid when the working machine is connected to the external power grid.

20 Claims, 3 Drawing Sheets

101 110 112 109 111 108 $U_{DC}$ 102 103 113 105 106a 107a 106b 107b 104 114 106c 107c AC power grid

WORKING MACHINE

CROSS-REFERENCE TO RELATED APPLICATION

This application claims foreign priority benefits under U.S.C. § 119 to European Patent Application No. EP17201772.5 filed on Nov. 15, 2017, the content of which is hereby incorporated by reference in its entirety.

TECHNICAL FIELD

The disclosure relates to a method for driving one or more auxiliary devices of a working machine. An auxiliary device can be, for example but not necessarily, a hydraulic pump, a blower, a compressor, or a coolant circulating pump. Furthermore, the disclosure relates to a working machine.

BACKGROUND

In many cases, a working machine comprises one or more electrically driven actuators. The working machine can be, for example, a mobile working machine having wheels and/or chain tracks. A mobile working machine can be for example a tractor, a bucket charger, a road drag, an excavator, or a bulldozer. It is also possible that the working machine is for example a stone crusher or a wood chipping machine that is not necessarily provided with means for moving the working machine. Each actuator can be for example a wheel, a chain track, a cutter of a wood chipping machine, or some other actuator of a working machine. A working machine of the kind described above comprises typically a direct voltage source and a power converter for transferring electric energy from the direct voltage source to one or more electric machines for driving the one or more actuators. The direct voltage source may comprise for example a battery element and/or a capacitor element. It is also possible that the direct voltage source comprises a generator, a combustion engine for driving the generator, and a power converter for converting the voltage of the generator into suitable direct voltage.

Typically, a working machine of the kind described above further comprises auxiliary devices for enabling and/or assisting the operation of the actuators of the working machine. An auxiliary device can be for example a hydraulic pump, a blower, a compressor, a coolant circulating pump, a heating system, or a cooling system. In a working machine having electrically driven actuators, also the auxiliary devices are typically electrically driven. A working machine may comprise for example one or more power converters for converting direct voltage of a direct voltage source, such as e.g. battery element, into voltages suitable for electric machines driving the auxiliary devices. Thus, a working machine of the kind described above may comprise many power converters which need room, cooling capacity, and maintenance. Furthermore, the need for many power converters increases the manufacturing costs of a working machine.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new working machine that can be, for example but not necessarily, a tractor, a bucket charger, a road drag, an excavator, a bulldozer, a stone crusher, or a wood chipping machine. A working machine according to the invention comprises:

- a direct voltage source,
- at least one first power converter for transferring electric energy from the direct voltage source to one or more electric machines for driving one or more actuators of the working machine,
- an electric connector system for electrically connecting to an external alternating current power grid,
- a second power converter for transferring electric energy from the external alternating current power grid to the direct voltage source, and
- one or more alternating current electric machines for driving one or more auxiliary devices for enabling and/or assisting the operation of the actuators of the working machine.

The electric connector system is suitable for connecting the one or more alternating current electric machines to receive alternating voltage of the external alternating current power grid. Thus, the alternating current electric machines driving the auxiliary devices can be energized directly by the external alternating current power grid when the working machine is connected to the external alternating current power grid. The above-mentioned second power converter is suitable for transferring electric energy from the direct voltage source to the one or more alternating current electric machines. Therefore, the second power converter has two functionalities: i) transfer electric energy from the external alternating current power grid to the working machine when the working machine is connected to the external alternating current power grid, and ii) energize the alternating current electric machines driving the auxiliary devices when the working machine is disconnected from the external alternating current power grid. The above-described arrangement reduces the complexity of a power electronic system of a working machine and thereby savings can be achieved in cooling capacity, maintenance, room requirement, and costs.

In accordance with the invention, there is provided also a new method for driving one or more auxiliary devices of a working machine of the kind described above. A method according to the invention comprises:

- controlling, in response to a situation in which the working machine has been disconnected from the external alternating current power grid, the second power converter to transfer electric energy from the direct voltage source to the one or more alternating current electric machines driving the one or more auxiliary devices, and
- connecting, in response to a situation in which the working machine has been connected to the external alternating current power grid, the one or more alternating current electric machines to receive the alternating voltage of the external alternating current power grid.

Various exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in conjunction with the accompanying drawings.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE DRAWINGS

Exemplifying and non-limiting embodiments of the invention and their advantages are explained in greater detail below in the sense of examples and with reference to the accompanying drawings, in which.

DETAILED DESCRIPTION

The specific examples provided in the description given below should not be construed as limiting the scope and/or the applicability of the appended claims. Furthermore, it is to be understood that lists and groups of examples provided in the description given below are not exhaustive unless otherwise explicitly stated.

Figure 1:
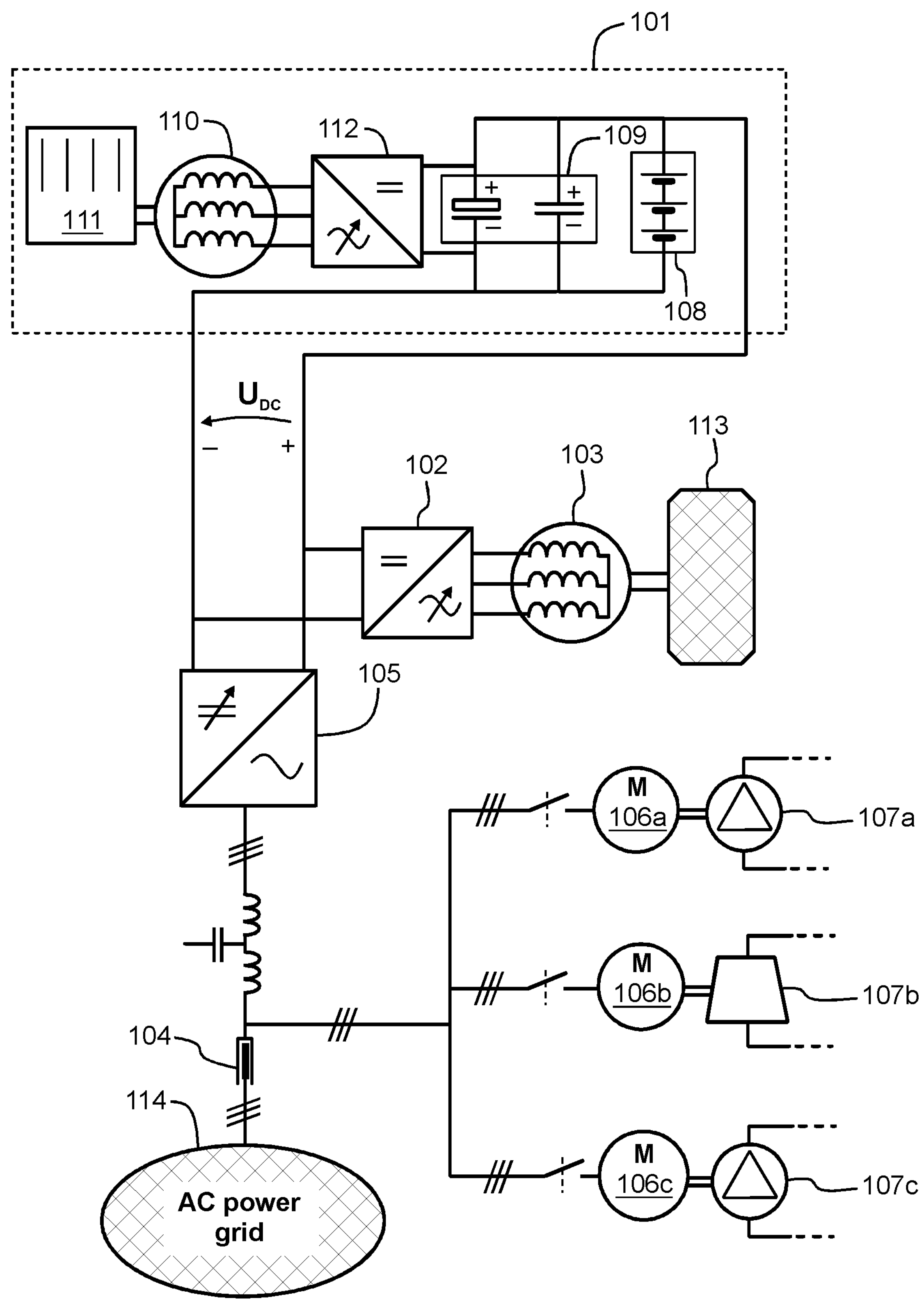
FIG. 1 shows a schematic illustration of a powering system of a working machine according to an exemplifying and non-limiting embodiment of the invention.

FIG. 1 shows a schematic illustration of a powering system of a working machine according to an exemplifying and non-limiting embodiment of the invention. The working machine comprises a direct voltage source 101. In this exemplifying case, the direct voltage source 101 comprises a battery element 108 and a capacitor element 109. The capacitor element 109 may comprise for example an electric double layer capacitor "EDLC" in order to increase the energy storing capacity of the capacitor element 109. An EDLC is sometimes called a "super capacitor". Furthermore, the direct voltage source 101 comprises a generator 110, a combustion engine 111 for driving the generator, and a power converter 112 for converting the voltage of the generator 110 into suitable direct voltage. The combustion engine 111 can be for example a diesel engine, an Otto-cycle engine, or a turbine engine. It is, however, also possible that the working machine is a full-electric working machine which does not comprise a combustion engine.

The working machine comprises at least one first power converter 102 for transferring electric energy from the direct voltage source 101 to at least one electric machine 103 for driving one or more actuators of the working machine. Each actuator can be for example a wheel, a chain track, a hydraulic pump, a cutter of a wood chipping machine, or some other actuator of a working machine. In the exemplifying case illustrated in FIG. 1, the electric machine 103 is arranged to drive an actuator 113 that is a wheel of the working machine. The working machine comprises an electric connector system 104 for electrically connecting to an external alternating current "AC" power grid 114. The working machine comprises a second power converter 105 for transferring electric energy from the external AC power grid to the direct voltage source 101 so that the battery element 108 and the capacitor element 109 can be charged from the AC power grid. The working machine comprises alternating current "AC" electric machines 106*a*, 106*b*, and 106*c* for driving auxiliary devices 107*a*, 107*b*, and 107*c* of the working machine. The auxiliary devices 107*a*-107*c* may comprise for example a hydraulic pump, a blower, a compressor, a coolant circulating pump, a heating system, and/or a cooling system.

The above-mentioned electric connector system 104 is suitable for connecting the AC electric machines 106*a*-106*c* to receive the alternating voltage of the external AC power grid 114. Thus, the AC electric machines 106*a*-106*c* driving the auxiliary devices 107*a*-107*c* can be energized directly by the external AC power grid 114 when the working machine is connected to the external AC power grid 114. The above-mentioned power converter 105 is suitable for transferring electric energy from the direct voltage source 101 to the AC electric machines 106*a*-106*c*. Therefore, the power converter 105 has two functionalities: i) transfer electric energy from the external AC power grid 114 to the working machine when the working machine is connected to the external AC power grid 114, and ii) energize the AC electric machines 106*a*-106*c* driving the auxiliary devices 107*a*-107*c* when the working machine is disconnected from the external AC power grid 114. In a working machine according to an exemplifying and non-limiting embodiment, the power converter 105 is suitable for changing the frequency of the alternating voltage supplied to the AC electric machines 106*a*-106*c* when the working machine is disconnected from the external AC power grid 114. In this exemplifying case, the frequency of the alternating voltage supplied by the power converter 105 can be e.g. lower than the frequency of the alternating voltage of the external AC power grid 114 when the power of the auxiliary devices 107*a*-107*c* can be lower.

Figure 2:
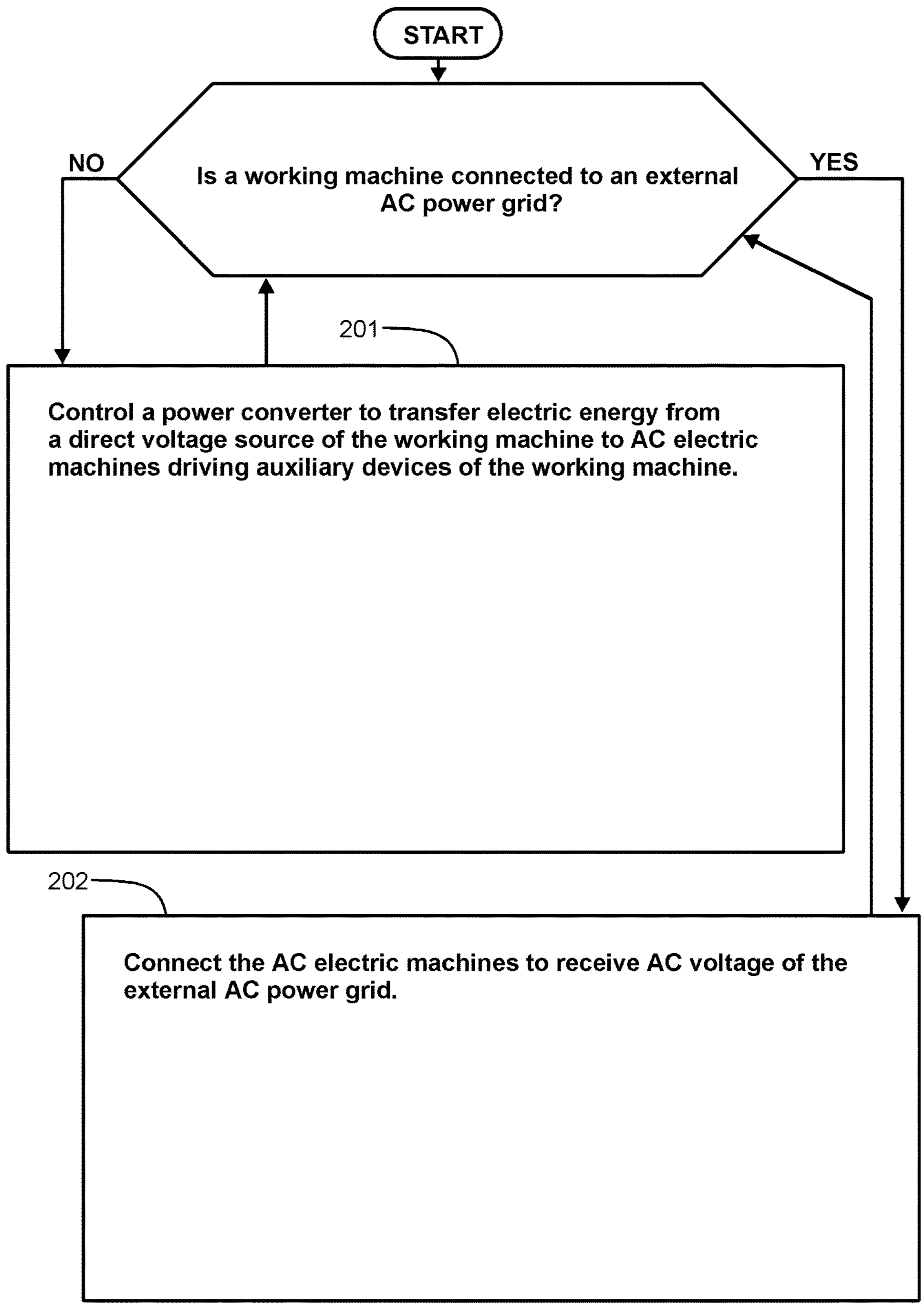
FIG. 2 shows a flow chart of a method according to an exemplifying and non-limiting embodiment of the invention for driving one or more auxiliary devices of a working machine.

FIG. 2 shows a flowchart of a method according to an exemplifying and non-limiting embodiment of the invention for driving one or more auxiliary devices of a working machine that comprises:

- a direct voltage source,
- at least one first power converter for transferring electric energy from the direct voltage source to one or more electric machines for driving one or more actuators of the working machine,
- an electric connector system for connecting to an external alternating current power grid, and
- a second power converter for transferring electric energy from the external alternating current power grid to the direct voltage source.

The method comprises the following actions:

- action 201: controlling, in response to a situation in which the working machine has been disconnected from the external alternating current power grid, the second power converter to transfer electric energy from the direct voltage source to one or more alternating current electric machines driving the one or more auxiliary devices, and
- action 202: connecting, in response to a situation in which the working machine has been connected to the external alternating current power grid, the one or more alternating current electric machines to receive alternating voltage of the external alternating current power grid.

Figure 3:
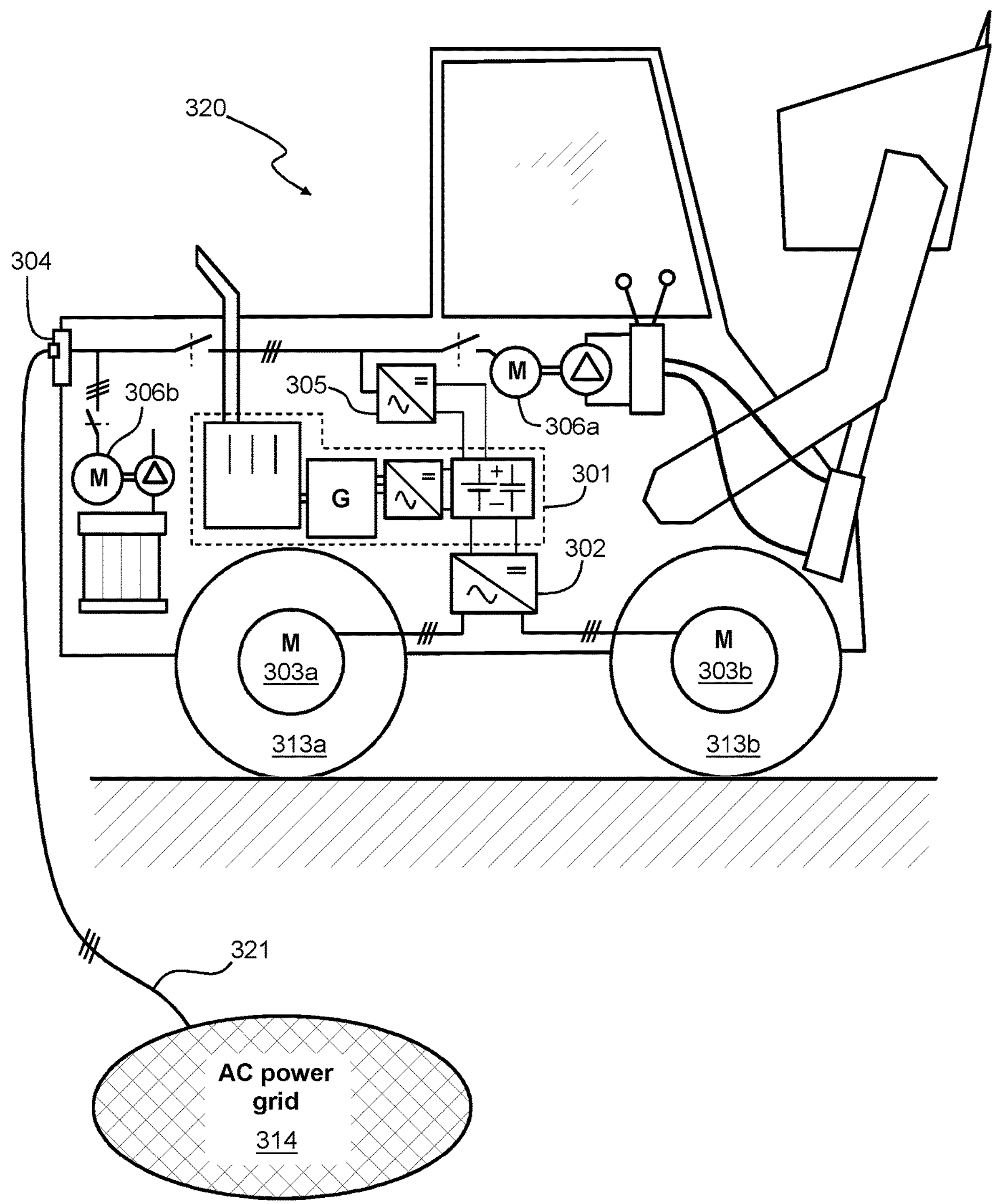
FIG. 3 shows a schematic illustration of a working machine according to an exemplifying and non-limiting embodiment of the invention.

FIG. 3 shows a schematic illustration of a working machine 320 according to an exemplifying and non-limiting embodiment of the invention. In this exemplifying case, the working machine 320 is a bucket charger but the working machine could as well be a tractor, a road drag, a bulldozer, a stone crusher, or a wood chipping machine or any other working machine. The working machine 320 comprises a direct voltage source 301. In this exemplifying case, the direct voltage source 301 comprises a battery element, a capacitor element, a generator, a combustion engine for driving the generator, and a power converter for converting the voltage of the generator into suitable direct voltage. The working machine 320 comprises electric machines at the hubs of wheels of the working machine. In FIG. 3, two of these electric machines are denoted with references 303*a* and 303*b* and two of the wheels of the working machine are denoted with references 313*a* and 313*b*. The working machine 320 comprises a first power converter 302 for transferring electric energy between the electric machines 303*a* and 303*b* and the direct voltage source 301. The power converter 302 is arranged to produce voltages having amplitudes and frequencies suitable for the electric machines 303*a* and 303*b*. The power converter 302 may comprise a separate and independently controlled output stage for each of the electric machines at the hubs of the wheels. In this case, these electrical machines can be controlled independently of each other. It is, however, also possible that the electrical machines at the hubs of the wheels are parallel connected to a same output stage of the power converter 302 and thus these electric machines are controlled as a group.

The working machine 320 comprises an electric connector system 304 for attaching an electric cable 321 mechanically to the working machine and for electrically connecting to an external alternating current "AC" power grid 314 through the electric cable 321. In a working machine according to another embodiment of the invention, the electric connector system comprises a pantograph for electrically connecting to electric conductors. The working machine 320 comprises a second power converter 305 for transferring electric energy from the external AC power grid 314 to the direct voltage source 301 so that the battery element and the capacitor element of the direct voltage source 301 can be charged from the AC power grid 314. The working machine comprises alternating current "AC" electric machines 306*a* and 306*b* for driving auxiliary devices of the working machine. In the exemplifying case illustrated in FIG. 3, the AC electric machine 306*a* is arranged drive a hydraulic pump of a hydraulic system of the working machine 320 and the AC electric machine 306*b* is arranged drive a coolant circulating pump of a cooling system of the working machine. The electric connector system 304 is suitable for connecting the AC electric machines 306*a* and 306*b* to receive the alternating voltage of the external AC power grid 314. The working machine 320 may further comprise one or more soft-starters for reducing starting currents of the electric machines 306*a* and/or 306*b*. The soft-starters are not shown in FIG. 3.

The above-mentioned power converter 305 is suitable for transferring electric energy from the direct voltage source 301 to the AC electric machines 306*a* and 306*c*. Thus, the AC electric machines 306*a* and 306*b* driving the auxiliary devices can be energized by the direct voltage source 301 when the working machine is disconnected from the external AC power grid 314. The power converter 305 can be suitable for changing the frequency of the alternating voltage supplied to the AC electric machines 306*a* and 306*c* when the working machine 320 is disconnected from the external AC power grid 314.

The specific examples provided in the description given above should not be construed as limiting the scope and/or the applicability of the appended claims. Lists and groups of examples provided in the description given above are not exhaustive unless otherwise explicitly stated.

What is claimed is:

1. A working machine comprising:

a direct voltage source, at least one first power converter for transferring electric energy from the direct voltage source to one or more electric machines for driving one or more actuators of the working machine, an electric connector system for electrically connecting to an external alternating current power grid, a second power converter for transferring electric energy from the external alternating current power grid to the direct voltage source, and one or more alternating current electric machines for driving one or more auxiliary devices of the working machine, wherein the electric connector system is suitable for connecting the one or more alternating current electric machines to receive alternating voltage of the external alternating current power grid, and the second power converter is suitable for transferring electric energy from the direct voltage source to the one or more alternating current electric machines.

2. The working machine according to claim 1, wherein the direct voltage source comprises a battery element.

3. The working machine according to claim 2, wherein the direct voltage source comprises a capacitor element.

4. The working machine according to claim 2, wherein the direct voltage source comprises a generator, a combustion engine for driving the generator, and a power converter for converting voltage of the generator into direct voltage.

5. The working machine according to claim 2, wherein the one or more auxiliary devices of the working machine comprise one or more of the following: a hydraulic pump, a blower, a compressor, a coolant circulating pump, a heating system, a cooling system.

6. The working machine according to claim 2, wherein the working machine is one of the following: a tractor, a bucket charger, a road drag, an excavator, a bulldozer, a stone crusher, a wood chipping machine.

7. The working machine according to claim 1, wherein the direct voltage source comprises a capacitor element.

8. The working machine according to claim 7, wherein the capacitor element comprises an electric double layer capacitor "EDLC".

9. The working machine according to claim 8, wherein the direct voltage source comprises a generator, a combustion engine for driving the generator, and a power converter for converting voltage of the generator into direct voltage.

10. The working machine according to claim 8, wherein the one or more auxiliary devices of the working machine comprise one or more of the following: a hydraulic pump, a blower, a compressor, a coolant circulating pump, a heating system, a cooling system.

11. The working machine according to claim 8, wherein the working machine is one of the following: a tractor, a bucket charger, a road drag, an excavator, a bulldozer, a stone crusher, a wood chipping machine.

12. The working machine according to claim 7, wherein the direct voltage source comprises a generator, a combustion engine for driving the generator, and a power converter for converting voltage of the generator into direct voltage.

13. The working machine according to claim 7, wherein the one or more auxiliary devices of the working machine comprise one or more of the following: a hydraulic pump, a blower, a compressor, a coolant circulating pump, a heating system, a cooling system.

14. The working machine according to claim 7, wherein the working machine is one of the following: a tractor, a bucket charger, a road drag, an excavator, a bulldozer, a stone crusher, a wood chipping machine.

15. The working machine according to claim 1, wherein the direct voltage source comprises a generator, a combustion engine for driving the generator, and a power converter for converting voltage of the generator into direct voltage.

16. The working machine according to claim 15, wherein the one or more auxiliary devices of the working machine comprise one or more of the following: a hydraulic pump, a blower, a compressor, a coolant circulating pump, a heating system, a cooling system.

17. The working machine according to claim 15, wherein the working machine is one of the following: a tractor, a bucket charger, a road drag, an excavator, a bulldozer, a stone crusher, a wood chipping machine.

18. The working machine according to claim 1, wherein the one or more auxiliary devices of the working machine comprise one or more of the following: a hydraulic pump, a blower, a compressor, a coolant circulating pump, a heating system, a cooling system.

19. The working machine according to claim 1, wherein the working machine is one of the following: a tractor, a bucket charger, a road drag, an excavator, a bulldozer, a stone crusher, a wood chipping machine.

20. A method for driving one or more auxiliary devices of a working machine that comprises:

a direct voltage source, at least one first power converter for transferring electric energy from the direct voltage source to one or more electric machines for driving one or more actuators of the working machine, an electric connector system for electrically connecting to an external alternating current power grid, and a second power converter for transferring electric energy from the external alternating current power grid to the direct voltage source, the method comprising controlling, in response to a situation in which the working machine has been disconnected from the external alternating current power grid, the second power converter to transfer electric energy from the direct voltage source to one or more alternating current electric machines driving the one or more auxiliary devices, characterized in that the method comprises connecting, in response to a situation in which the working machine has been connected to the external alternating current power grid, the one or more alternating current electric machines to receive alternating voltage of the external alternating current power grid.

* * * * *